United States Patent [19]

Parekh

[11] 4,064,191

[45] Dec. 20, 1977

[54] COATING COMPOSITION CONTAINING AN ALKYLATED GLYCOLURIL, A POLYMERIC NON-SELF-CROSSLINKING COMPOUND AND AN ACID CATALYST

[75] Inventor: Girish Girdhar Parekh, Stamford, Conn.

[73] Assignee: American Cyanamid Company, Stamford, Conn.

[21] Appl. No.: 665,488

[22] Filed: Mar. 10, 1976

[51] Int. Cl.$^2$ .................. C08L 61/26; C08L 67/02
[52] U.S. Cl. ............................ 260/850; 260/31.2 N; 260/31.2 XA; 260/33.2 R; 260/33.4 R; 260/39 M; 260/849; 260/851; 428/458; 428/460
[58] Field of Search .......... 260/849, 850, 851, 29.4 R, 260/29.46 A

[56] References Cited

U.S. PATENT DOCUMENTS

| | | | |
|---|---|---|---|
| 3,449,228 | 6/1969 | Yurcheshen | 260/851 |
| 3,758,324 | 9/1973 | Barrett | 260/29.4 R |

FOREIGN PATENT DOCUMENTS

| | | |
|---|---|---|
| 1,486,213 | 5/1967 | France. |
| 1,146,858 | 3/1969 | United Kingdom. |
| 956,741 | 4/1964 | United Kingdom. |

OTHER PUBLICATIONS

Chem. Abstracts vol. 83, p. 134, 1975.

*Primary Examiner*—Theodore E. Pertilla
*Attorney, Agent, or Firm*—John L. Sullivan; James T. Dunn

[57] ABSTRACT

An organic solvent based composition comprising a blend of certain quantities of a partially or fully alkylated glycoluril blended with certain organic solvent dispersible non-gelled, non-self-crosslinking polymeric materials containing only certain reactive groups and catalyzed with small quantities of an acid catalyst which will cause the glycoluril derivative to crosslink with the polymeric material, when subjected to heat.

10 Claims, No Drawings

COATING COMPOSITION CONTAINING AN ALKYLATED GLYCOLURIL, A POLYMERIC NON-SELF-CROSSLINKING COMPOUND AND AN ACID CATALYST

CROSS REFERENCE TO RELATED APPLICATION

Reference is made to my copending application Ser. No. 654,446 filed Feb. 2, 1976 now abandoned entitled Organic Metal Finishes.

BACKGROUND OF THE INVENTION

Organic Metal Finishes have been commercially available for a substantial plurality of years. Coatings from natural materials such as linseed oil were superceded in time by synthetic polymeric materials. Frequently, these earlier materials were dissolved in organic solvents and deposited by any of a plurality of conventional methods to metallic substrates and dried or baked to produce the desired coating on the metal substrates. Some of these earlier coating compositions were not as hard nor as chemically (solvents, acids etc.) resistant as desired and as a consequence, further developments produced blends of crosslinkable polymeric materials which were used in conjunction with a crosslinking agent which, when the combination was used as a coating on a metallic substrate and then baked so as to convert the crosslinkable polymeric material and the crosslinking agent to a thermoset state, so as to provide a hard, chemical resistant film. Presently, the most commonly used crosslinking agents are based on triazines such as melamine, benzoguanamine or the ureas including urea per se and thiourea. However, these crosslinking agents do not fill all of the needs of the present time and newly developing coating applications. These newly developing coating applications require in certain instances superior film performance than that which is achievable at the present time with the already known crosslinking agents.

FIELD OF THE INVENTION

The present invention is in the coating resin field and provides a novel organic solvent solution of a mixture or blend of certain partially or fully alkylated glycoluril derivates and certain organic solvent soluble, normally nonself-crosslinking polymeric materials that are acid catalyzed and which can be deposited on a substrate by any one of a plurality of methods including coating, spraying, dipping, brushing and rollercoating and the like and after the application of the coating composition to the metal substrate, the coated substrate is baked at the appropriate temperature wherein the crosslinking agent through the assistance of the acid catalyst, crosslinks with the polymeric material and produces a hard, chemical resistant film.

DESCRIPTION OF THE PRIOR ART

The most pertinent prior art known to the instant applicant is the British Pat. No. 1,146,858 and its French counterpart Pat. No. 1,486,213. No U.S. counterpart patent is known by the applicant to exist.

SUMMARY OF THE INVENTION

This invention relates to an organic solvent soluble composition comprising a blend of from about 2% to about 50% by weight of (A) a partially or fully alkylated glycoluril derivative having the following structural formula:

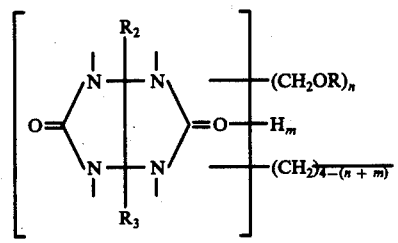

wherein $n$ is a whole integer between 1 and 4 inclusive; $m$ is a whole integer between 0 and 2 inclusive; each R is, individually, hydrogen or an alkyl radical containing from 1 to 6 carbon atoms, inclusive, wherein the said alkyl radicals may be the same or different alkyl radicals; $R_2$ and $R_3$ are separately hydrogen or an alkyl radical having from 1 to 6 carbon atoms inclusive or a phenyl radical and correspondingly from about 98% to about 50% by weight of (B) an organic solvent soluble, normally non-self-cross-linking (under normal baking conditions) polymeric material having as reactive groups, any one or more of carboxyl groups, alcoholic hydroxyl groups or amide groups wherein the amount of said groups is at least about 0.5% by weight, and not more than about 25%, by weight, based on the total weight of said polymeric material; and (C) from about 0.05% to 5.0% by weight of an acid catalyst based on the total weight of (A) and (B), wherein said reactive groups of (B) are heat reactive with (A) and wherein said percentages of (A) and (B), by weight, total 100% and are based on the total solids weight of (A) and (B). Normal baking conditions for these coatings are generally 200° C. or less for 30 minutes or less.

In the last 10 years, dramatic changes have taken place in the organic coating technology. New application methods such as electrocoating, powder coatings and ultraviolet light curable coatings have emerged in the last decade. However, the existing crosslinking agents based on melamine, guanamines, including benzoguanamine, or urea and substituted ureas do not fill all of the needs of the present coating market. The glycoluril derivatives used in the present invention are a new class of crosslinking agents which fills such needs. The coatings prepared, using glycoluril derivatives as crosslinking agents, show superior performance over the crosslinking agents based on benzoguanamine, melamine or ureas. The superior performance is obtained in the following respects:

a. superior humidity resistance.
b. high gloss retention after overbake.
c. superior salt spray resistance.
d. better adhesion of the coating to the substrate.
e. shows no impact frilling either on overbake or exposure to humidity.
f. good exterior durability.

The starting material of these derivatives is glycoluril per se and is also known as acetylenediurea. The precise chemical name for glycoluril is tetrahydroimidazo-(4, 5-d) imidazole 2, 5(1H, 3H)-dione. The glycoluril is prepared by reacting two moles of urea with one mole of glyoxal. The glycoluril can then be methylolated, partially or fully by reacting one mole of glycoluril with between about 1 and 4 moles of formaldehyde. When the glycoluril is fully methylolated, it is identified as tetramethylol glycoluril. The methylolated glycolurils must be alkylated and may be alkylated either partially or fully, depending on whether or not the glycoluril is partially or fully methylolated and depending further on whether or not partial or full alkylation is desired. If the tetramethylol glycoluril is reacted with a selected amount of a aliphatic or cycloaliphatic alcohol containing from 1 to 6 carbon atoms, one can produce, for instance, the tetra (alkoxy methyl)-glycoluril or partially alkylated glycolurils. These monohydric alcohols may be primary or secondary alcohols. The monohydric alcohols that can be used to achieve this alkylation may be methanol, ethanol, n-propanol, n-butanol, n-amyl alcohol, n-hexyl alcohol, isobutanol, isopropanol, sec-butanol, cyclohexanol and the like.

Some of these glycoluril derivatives are already identified in the chemical literature but in order to illustrate the method for the preparation thereof, the following examples as set forth in which all parts are parts by weight unless otherwise indicated. These examples are set forth primarily for the purpose of illustration and any specific enumerations of detail contained therein should not be interpreted as a limitation on the case except as is indicated in the appended claims.

PREPARATION OF GLYCOLURIL

Into a suitable reaction vessel equipped with stirrer, thermometer, and reflux condenser, there was introduced 765 parts of urea and 875 parts of water. To this slurry, 282 parts of concentrated sulfuric acid were charged and the mixture was heated to 70° C. At 70° C., 605 parts of glyoxal (40% aqueous solution and free from formaldehyde) were added slowly to the clear solution such that the reaction temperature is maintained between 75°–80° C. After the addition of glyoxal, the reaction mixture was held at 75° C. for one hour and then cooled. The separated crystalline glycoluril was filtered and washed with water and a dilute caustic aqueous solution. The glycoluril obtained after drying has a m.p. of 298°–300° C. and the yield was 88% (525 parts).

PREPARATION OF TETRAMETHYLOL GLYCOLURIL

Into a suitable reaction vessel equipped with a stirrer, thermometer, and reflux condenser, there was introduced 688 parts (10 moles) of aqueous formaldehyde (44%), and the pH was adjusted to 8.7 with 22 parts of 0.5 N NaOH solution. To this solution, 284 parts (2 moles) of glycoluril were added at 40° C. During the reaction, the temperature was allowed to rise up to 55° C. At this stage, most of the glycoluril went into solution. After about 15 minutes, the pH was adjusted to 8.0 with five parts of 0.5 N NaOH. A clear pale yellow colored solution was obtained. The clear solution was distilled at 50° C. under reduced pressure to remove water, until the reaction vessel content was about 640 parts. The syrup in the vessel was poured into 800 parts of methanol. The white crystalline precipitate was filtered and dried. The total yield of the tetramethylol glycoluril was 483 parts (92% yield) and m. p. 132°–136° C.

PREPARATION OF TETRABUTOXYMETHYL GLYCOLURIL

Into a suitable reaction vessel equipped with a stirrer, thermometer, and reflux condenser there was introduced 1,000 parts (13.5 moles) of n-butanol and 7.0 parts of concentrated nitric acid and 20 parts of water. To this mixture was added 200 parts of tetramethylol glycoluril (0.76 mole) and the reaction mixture was stirred at 40° C. for 2 hours. The reaction mixture became a clear solution. It is then distilled at reduced pressure between 45°–50° C. to remove the butanol/water azeotrope mixture. After 260 parts of the n-butanol/water mixture were removed, 260 parts of n-butanol were added to the clear solution and the reaction temperature was lowered to 22°–25° C. The solution was neutralized with 10% caustic to a pH 9–10, followed by removal of more of a n-butanol/water mixture under reduced pressure. The residue was filtered with a filter aid. The resulting water-white syrup had a Gardner-Holdt viscosity of Y-Z (25° C.). Pan solids were 95% (2 hours at 105° C.) and foil solids were 97% (45 minutes at 45° C.). The gel phase chromatography indicated that the product was 85% monomeric. The nuclear magnetic resonance (n.m.r.) of the product confirmed the structure of the monomer to be tetrabutoxymethyl glycoluril.

PREPARATION OF TETRABUTOXYMETHYL GLYCOLURIL

Into a suitable reaction vessel equipped with a stirrer, thermometer, and reflux condenser there was introduced 344 parts (5 moles) of aqueous formaldehyde (44%) and the pH was adjusted to 7.5 with 6 parts of 0.5N NaOH solution. To this solution, 142 parts of glycoluril (1 mole) were added and the reaction mixture was heated to 80° C. Two parts of 0.5N NaOH solution were added to adjust the pH to 7.0. In half an hour, the reaction mixture became a clear solution. It was then cooled to 25° C. and the pH was adjusted to 7.4 with three parts of 0.5N NaOH solution. The clear pale yellow colored solution was then distilled at 55° C. under reduced pressure to remove water. After 150 parts of water were removed, 740 parts (10 moles) of n-butanol and 1 part of concentrated nitric acid were added to the resulting syrup. The mixture was heated to reflux with stirring. After about 10 minutes, the reaction mixture become clear and water white; the reflux temperature was 95°–98° C. The water formed during the reaction was decanted by the use of a standard decant apparatus. In about three hours, 150 parts of decant liquid (water with 8% n-butanol) were collected. The reaction temperature after that period was 115°–116° C. When water stopped coming over by decant, the solution was cooled to 22°–24° C. and neutralized with 10 parts of 0.5N NaOH solution. The excess butanol was removed at atmospheric pressure, and later under reduced pressure, and residual syrup was filtered in the presence of activated charcoal and filter aid. The yield of the resulting syrup was 410 parts (approximately 87% yield). The other physical characteristics were as follows: Foil Solids: 96.4%; Pan Solids: 94.7%; Gardner-Holdt Viscosity (25° C.): P-Q; Gardner Color: 1; Water insoluble.

PREPARATION OF PARTIALLY METHYLATED GLYCOLURIL

Into a suitable reaction vessel equipped with a stirrer, thermometer, and reflux condenser there was introduced 950 parts (30 moles) of methanol and 40 parts of concentrated hydrochloric acid. To this mixture, 262 parts (1 mole of tetramethylol glycoluril) were added and the reaction mixture was stirred at 25°–30° C. In about 15-20 minutes, all the tetramethylol glycoluril went into solution. After half an hour, the reaction mixture was neutralized with 140 parts of sodium bicarbonate and 20 parts of sodium carbonate at 22°–23° C. The pH after neutralization was about 8. The salt was filtered. The filtrate was concentrated at 60° C. under reduced pressure. The yield of the syrupy product after filtration of the salt was 290 parts, which was diluted to 90% solids with cellosolve. The product characteristics were as follows: Foil Solids: 91.4%; Pan Solids: 82.2%; and Gardner-Holdt Viscosity (25° C.): $Z_1$. I.R. of the product indicated that the methylated product has a significant amount of unreacted methylol groups.

PREPARATION OF TETRAMETHOXYMETHYL GLYCOLURIL

Into a suitable reaction vessel equipped with stirrer, thermometer, and condenser were charged 640 parts (20 moles) of methanol and 20 parts of 70% con. nitric acid. To this acidic methanol, 262 parts (1 mole) of tetramethylol glycoluril were charged, and the reaction mixture was heated to 40° C. with stirring. In about 20 minutes, all of the tetramethylol glycoluril went into solution. When the reaction mixture became clear, it was cooled to 22° C. and 45 parts of 20% sodium hydroxide solution were added to neutralize the reaction mixture to a pH of 7–8. The neutralized clear solution was heated to 50°–55° C. and 450 parts of methanol were removed under slightly reduced pressure. The residue in the flask crystallized on standing for a few hours. The cyrstalline solids were filtered and washed with a small amount of water. The filtrate was then vacuum stripped at 70°–80° C. to remove all the water. The solid residue was then dissolved in benzene and the undissolved salt was removed by filtration. The benzene solution was mixed with the first crop of solid crystals and dissolved with additional benzene and was filtered again. On removal of benzene, 310 parts of tetramethoxymethyl glycoluril (TMMGU) was obtained. The yield was 97%. It was recrystallized from benzene. The recrystallized product had the melting point of 116°–118° C. The structure of TMMGU was confirmed by I.R., N.M.R. and nitrogen analysis.

PREPARATION OF DIMETHOXYMETHYL DIETHOXYMETHYL GLYCOLURIL

Into a suitable reaction vessel equipped with stirrer, thermometer, and condenser, were charged 320 parts (10 moles) of methanol, 460 parts of ethanol (10 moles), and 20 parts of 70% concentration of nitric acid. To this acidic alcoholic mixture, 262 parts (1 mole) of tetramethylol glycoluril were charged, and the reaction mixture was heated to 40° C. with stirring. In about 20 minutes, all of the tetramethylol glycoluril went into solution. When the reaction mixture became clear, it was cooled to 22° C. and 45 parts of 20% sodium hydroxide solution were added to neutralize the reaction mixture to pH 7–8. The neutralized clear solution was heated slowly to 105° C. under reduced pressure, to remove substantially all of the alcohol-water mixture. The resultant syrup was filtered hot at 80° C. to remove the inorganic salt and other impurities. The yield of the syrupy dimethoxymethyl diethoxymethyl glycoluril was 320 gms. The structure of this product was confirmed by N.M.R. The Pan Solids were 95.0%, and Foil Solids were 98.5%. The Gardner-Holdt viscosity was $Z_3$–$Z_4$ (25° C.).

The glycoluril materials used in the composition of the present invention are identified as glycoluril derivatives notwithstanding the fact that many of the materials used in this category will be modified glycoluril compounds. On the other hand, some measure of self condensation may take place in the preparation of these gylcoluril derivatives which will result in the production of polymeric materials such as dimers, trimers, tetramers and the like which would put them in the category of condensation products or resinous materials. In many instances the polymeric glycoluril derivatives are preferred in organic soluble coating compositions for the compatability of the total composition or to obtain desired film properties. A polymeric glycoluril derivative of a desired degree of polymerization or condensation, can be prepared by the selection of the right reaction condition and the selected mol ratios of the glycoluril, formaldehyde and the monohydric alcohol. These glycoluril derivatives can be fully alkylated or partially alkylated. The preferred molecular weight of these glycolurils should be between 216 and 5,000.

These glycoluril derivatives may contain from 1 to 4 alkoxymethyl groups or may contain any combination of at least 1 alkoxymethyl group and a maximum of 3 methylol groups. When there is only one alkoxymethyl group and no methylol groups there must be at least one methylene bridge.

Among the glycoluril derivatives that may be used as the crosslinking agent in the compositions of the present invention are the monomethylether of dimethylol glycoluril, the dimethylether of dimethylol glycoluril, the trimethylether of tetramethylol glycoluril, the tetramethylether of tetramethylol glycoluril, tetrakisethoxymethyl glycoluril, tetrakispropoxymethyl glycoluril, tetrakisbutoxymethyl glycolruil, tetrakisamyloxymethyl glycoluril, tetrakishexoxymethyl glycoluril and the like. If desired, one may utilize mixed ethers such as the diethyl, dimethylethers of tetramethylol glycoluril, the diethyl, dipropylethers of tetramethylol glycoluril, the dibutyl, diethylethers of tetramethylol glycoluril, the diethyl, dihexylethers of tetramethylol glycoluril and the like. When solubility is desired in non-polar organic solvents, it is preferred to make use of the higher alkoxy derivatives such as the tetrakisbutoxymethyl glycoluril. Also, when the use of colloidal dispersions of the laticiferous dispersions are to be used, the higher alkoxy derivatives are used such as the tetrakisbutoxymethyl glycoluril. In certain cases it may be desirable to use polymeric, partially or fully alkylated glycoluril-formaldehyde derivatives. If desired, these crosslinking agents may be used singly or in combination with one another although it is generally preferred to use these crosslinking agents singly. The amount of the glycoluril derivatives used in the compositions of the present invention may be varied between about 2% and about 50%, by weight, based on the total solids weight of the glycoluril derivatives and the organic solvent soluble, non-gelled, non-self-crosslinking polymeric material. It is preferred to use the glycoluril derivatives in the weight percent basis varying between about 10% and 40%, by weight, same basis. There obviously will then be present in the composition between about 50% and about 98%, by weight, of the non-self-crosslinking polymeric material and preferably between about 60% and 90%, by weight, of said polymeric material, same basis, wherein the percentages of the glycoluril derivative and the polymeric material, by weight, total 100% and are based on the total solids weight of the glycoluril derivative and the polymeric material.

The component (B) used in the composition of the present invention is an organic solvent soluble, normally non-self-crosslinking polymeric material which contains certain reactive groups including any one or more of carboxyl groups, alcoholic hydroxyl groups or amide groups. The amount of said groups that is present in said polymeric material may be varied between about 0.5%, by weight, and not more than about 25%, by weight, based on the total weight of said polymeric material. For most technical purposes these reactive groups will be the sole reactive groups in the polymeric material. Any one of these reactive groups may be present in the polymeric material to the exclusion of the other reactive groups or all three of these three reactive groups may be present in the polymeric material simultaneously. These polymeric materials may be anionic or non-ionic. These polymeric materials may be any one of a plurality of vinyl polymers which may be prepared by polymerizing polymerizable monomers containing reactive carboxyl groups such as acrylic acid, methacrylic acid, crotonic acid, cinnamic acid, $\beta$-benzoyl acrylic acid and polycarboxylic acids of the $\alpha,\beta$-ethylenically unsaturated class such as maleic, fumaric, itaconic, mesaconic, aconitic and the halogenated acids such as the halogenated maleic, or more specifically, chloromaleic acid and the like. These carboxylic groups containing nonomers can be used either singly or in combination with one another in the required amount and may be used with other polymerizable monomers that contain reactive alcoholic hydroxy groups or the reactive amide groups or may be used with other monomers which contain no reactive groups other than the reactive ethylenic double bond including no carboxylic groups such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate and the like. These polymerizable monomers, devoid of any reactive groups, may be used singly or in combination with one another in copolymerizing with a monomer containing a reactive group of the class described. Still further, one could use such other polymerizable compounds containing no reactive groups such as styrene, o-, m-, or p-alkyl styrenes such as the o-, m-, or p-methyl, ethyl, propyl and butyl styrenes, 2,4-dimethyl styrene, 2,3-dimethyl styrene, 2,5-dimethyl styrene, vinyl naphthalene, methyl vinyl ether, n-butyl vinyl ether, phenyl vinyl ether, acrylonitrile, methacrylonitrile, halo ring or side chain styrenes such as $\alpha$-chloro styrene, o-, m-, or p- chloro styrene, 2,4-dichlorostyrene, 2,3-dichlorostyrene, 2,5-dichlorostyrene or the alkyl side chain styrenes such as the $\alpha$-methylstyrene, $\alpha$-ethylstyrene and the like.

If one wishes to prepare a polymeric material as component (B), utilizing a polymerizable monomer containing a reactive alcoholic group, one may use such polymerizable vinyl monomers as the hydroxy alkyl esters of the $\alpha$, $\beta$, unsaturated monocarboxylic acids such as the hydroxy alkyl esters of acrylic acid, methacrylic acid, ethacrylic and the chloro as well as the other halo substituted acrylic acids. These esters may either have a primary or a secondary hydroxyl group. Illustrative of the types of compounds that can be used to make the polymers containing the reactive alcoholic hydroxy groups are 2-hydroxyethyl acrylate, 2-hydroxypropyl acrylate, 3-hydroxypropyl acrylate, 2-hydroxybutyl acrylate, 3-hydroxybutyl acrylate, 4-hydroxybutyl acrylate, 8-hydroxyoctyl acrylate, 2-hydroxyethyl methacrylate, 5-hydroxyhexyl methacrylate, 6-hydroxyoctyl methacrylate, 8-hydroxyoctyl methacrylate, 10-hydroxydecyl methacrylate, 3-hydroxypropyl crotonate, 4-hydroxyamyl crotonate, 5-hydroxyamyl crotonate, 6-hydroxyhexyl crotonate, 7-hydroxyheptyl crotonate, 10-hydroxydecyl crotonate, and the like. These hydroxy esters may be used either singly or in combination with one another or with the polymerizable vinyl monomers devoid of any reactive group including those set forth hereinabove in the discussion of the carboxyl group-containing monomers. Obviously, these hydroxy ester monomers may be used in combination with the reactive carboxyl group-containing monomers set forth hereinabove.

Among the amide group-containing monomers which may be used to prepare the polymeric material identified as component (B) are acrylamide, methacrylamide, ethacrylamide and the like. These polymerizable acrylamides may be used to prepare the polymeric materials used in the present invention with any of the carboxyl group-containing monomers and/or the hydroxyl group-containing monomers or with any of the polymerizable monomers set forth hereinabove that are devoid of any reactive groups. These polymeric materials whether they contain the reactive carboxyl groups and/or the reactive alcoholic hydroxy groups and/or the reactive amide groups will be anionic or non-ionic polymeric materials.

Additionally, one can make use of polyester resin compositions which are organic solvent dispersible, non-gelled, polymeric materials. Organic solvent dispersible alkyd resins, whether oil free or glyceride oil-containing, may be used and a plurality of these materials are commercially available and are also well known in the art and, as a consequence, it is not deemed necessary to make any prolonged recitation of such materials since they are fundamentally prepared by reacting polyhydric alcohol with a polycarboxylic acid or with anhydrides such as phthalic anhydride, maleic anhydride, and the like.

Additionally, one can use certain polyether polyols such as those prepared by reacting one mole of bis-phenol A and/or hydrogenated bis-phenol A with at least two moles of ethylene oxide and/or propylene oxide.

The following examples are illustrative of the various kinds of organic solvent soluble, non-gelled, nonself-crosslinking polymeric materials which can be used in the composition of the present invention.

POLYESTER RESIN A

This oil free saturated polyester resin is commercially available and is prepared by reacting isophthalic acid, adipic acid and propylene glycol in a conventional esterification process. This polyester resin is identified as a saturated polyester resin inasmuch as it is free of non benzenoid unsaturation. The polyester, designed for coil coating, has the following characteristics: Solids 70% in Solvesso 150, a high boiling hydrocarbon solvent; GardnerHoldt viscosity (25° C.) $Z_1$-$Z_3$; acid number 10 maximum; hydroxy number 30.

EXAMPLE RESIN B

Resin B is a polyether polyol, that is available commercially. Resin B is prepared by reacting one mole of bis-phenol A with four moles of ethylene oxide. This polyether polyol has a hydroxyl number of about 260-270.

ACRYLIC RESIN C

Acrylic resin C is a commercially available anionic acrylic polymer prepared by the standard polymerization techniques in an inert organic solvent such as 2-ethoxyethanol in which 55 parts of n-butylacrylate, 30 parts of styrene, and 15 parts of acrylic acid are copolymerized. At the end of the polymerization, the resulting polymer is diluted to 75% solids with n-butanol. The average molecular weight of the polymeric material is about 10,000-20,000 and has an acid number of 115. This polymer is designed for water-based coatings and electrocoatings. At 75% solids and 25° C., it has a Gardner-Holdt viscosity of $Z_6+$.

RESIN D

Into a suitable reaction vessel equipped with a stirrer, thermometer, inert gas-inlet and outlet tubes and partial condenser, there was introduced 668 parts of neopentyl glycol, 96 parts of trimethylol propane, 509 parts of isophthalic acid and 448 parts of adipic acid. These reactants were heated under a blanket of nitrogen gas to a temperature of 230° C., while the water of esterification was continuously removed with constant agitation. After 7 hours, the acid number of the reaction mass was 9. The reaction mass was cooled to 150° C. and diluted to 90% solids with a 1:1 mixture of n-butyl acetate and cellosolve acetate. The final product had the Gardner-Holdt viscosity of $Z_6+$ at 90% solids. The resin had a hydroxyl number of 88 and an acid number of 9.

The third essential component (C) used in the compositions of the present invention is an acid catalyst. This catalyst is used in an amount varying between 0.05% to about 5.0%, by weight, based on the total solids weight of (A) and (B). It is preferred to use between about 0.1% and 2.5%, by weight, of the acid catalyst, same basis. Among the preferred acid catalysts that may be used in the compositions of the present invention are: trismethyl sulfonylmethane, trishexyl sulfonylmethane, p-toluene sulfonic acid, n-dodecyl benzene sulfonic acid, naphthalene sulfonic acid, dinonyl napthalene disulfonic acid and the like. Reference is made to copending application of Leonard Josef Calbo, Jr., Ser. No. 512,282, filed Oct. 4, 1974, which is incorporated herein by reference. The catalytic activity of an acid can also be generated in the coating compositions of the present invention by incorporating sulfonic acid groups into the polymeric material (B). This can be achieved by copolymerizing from about 0.1% to about 5.0% (based on the total monomer weight) of a monomer such as 2-sulfoethyl methacrylate, styrene sulfonic acid and the like. It is also possible to use alkyl esters of phosphoric acid or alkylphosphonic acids as the acid catalyst in the coating compositions of the present invention.

Weaker organic acids such as formic acid, acetic acid, phthalic acid and the like may be used but are not preferred because they are not effective in promoting the cross-linking reaction at temperatures below 175° C in a reasonable period of time such as less than about 30 minutes.

Inorganic acids such as nitric, sulfuric, phosphoric, hydrohalic, Lewis acids and the like may also be used.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLES 1 AND 2 AND COMPARATIVE EXAMPLE 3

Three paint formulations, shown hereinbelow in Table I, were prepared utilizing the oil free saturated polyester resin A and a crosslinking agent which, in the first and second examples, was the tetrabutoxymethyl glycoluril (TBMGU) and in the third comparative example, the crosslinking agent was hexakismethoxymethylmelamine (HMMM). In Examples 1 and 2, the resin-crosslinking agent ratios were 76/24 and 83/17 respectively. In the comparative Example 3, the resin-crosslinking agent (HMMM) ratio was 90/10. It had been determined from experience that the best film properties were obtained at this level of HMMM content and when the cure temperature of 230° C. was used for 60 seconds. These organo-soluble enamels were prepared by using a three roll mill. The enamels, thus prepared, were drawn down on Alodine 1200S treated aluminum panels using a 0.002 inch draw-blade. Some of the films were cured at 230° C. for 60 seconds and others were cured at 260° C. for 60 seconds. In Table II, set forth hereinbelow, there is shown the film properties obtained from the three formulations. Table II shows that the enamels prepared from the TBMGU are superior in performance over that prepared from HMMM in the following respects: (a) shows no impact frilling either on overbake or exposure to humidity; (b) superior humidity resistance; (c) better fabrication properties as shown by a good T-0 bend. The enamels based on the TBMGU show good oven bake gloss retention and superior accelerated weathering tests.

TABLE I

|  | Example 1 | Example 2 | Comparative Example 3 |
|---|---|---|---|
| Titanium dioxide Pigment | 119.3 | 119.3 | 119.3 |
| Saturated Polyester Resin A | 56.9 | 56.9 | 68 |
| Saturated Polyester Resin A | 105.4 | 84.0 | 119.5 |
| TBMGU (97.5%) | 37.1 | 23.0 | — |
| Cellosolve acetate | 18.9 | 18.9 | 18.9 |
| HMMM | — | — | 14.3 |
| Silicone L 5310 resin | 0.15 | 0.15 | 0.15 |
| Isophorone | 2.5 | 6.8 | 2.6 |
| Diacetone alcohol | 2.5 | 4.8 | 11.3 |
| Butyl Cellosolve | 3.0 | 3.0 | 3.0 |
| Solvesso 150 | 34.5 | 64.1 | 20.0 |
| N-Butanol | 16.9 | 17.1 | 13.0 |
| p-Toluene sulfonic acid | 0.3 | 0.3 | 0.3 |
| Pigment/Binder | 80/100 | 90/100 | 80/100 |
| Resin/Crosslinker | 76/24 | 83/17 | 90/10 |

TABLE II
ENAMEL PROPERTIES

|  | Example 1 | | Example 2 | | Comparative Example 3 |
|---|---|---|---|---|---|
| Polyester Resin A/CLA | 76/24 | | 83/17 | | 90/10 |
| Crosslinking agent (CLA) | TBMGU | | TBMGU | | HMMM |
| Cure cycle, 60", seconds | 230° C | 260° C | 230° C | 260° C | 230° C |
| Film thickness, mils | 0.8 | 0.8 | 0.8 | 0.8 | 1.0 |
| Gloss, 60° | — | 95 | 94 | 92 | 97 |
| Gloss, 20° | — | 87 | 80 | 82 | 89 |
| Knoop hardness (KH $N_{25}$) | 3.8 | 7.4 | 5.0 | 9.2 | 6.2 |
| Impact, reverse, in lbs. | 70 | 70 | 70 | 70 | 70 |

TABLE II-continued
ENAMEL PROPERTIES

|  | Example 1 | Example 2 |  | Comparative Example 3 |
|---|---|---|---|---|
| Fabrication potential, T-bend passes | T-0 | T-0 to T-1 | T-0 | T-2 | T-0 |
| Adhesion, cross hatched and taped | 100 | 100 | 100 | 100 | 100 |
| MEK Resistance, double rubs | 200+ | 200+ | 200+ | 200+ | 200+ |
| Oven bake 60" Gloss, 20° % retention | 100 | 98 | 100 | 100 | 100 |
| Impact frilling, none on impact bump | 60 | 60 | 70 | 50 | 70 |
| T-bend, no popping on bend | T-2 | T-2 | T-0 | T-2 | T-1 to |
| Cure cycle, 60" seconds |  | 260° C | 230° C |  | 260° C |
| Effect of Cleveland Humidity test (60° C) on the impacted enamel (10 to 70 in. lbs.) | — | — |  |  |  |
| Initial impact resistance, reverse, passes | — | 70 | 70 |  | 70 |
| After 1 hour | — | 70 | 70 |  | 40 |
| After 24 hours | — | 70 | 70 |  | 40 |
| After 4 days | — | 70 | 70 |  | 40 |
| After 8 days | — | 70 | 70 |  | 40 |
| After 18 days | — | 70 | 70 |  | 40 |
| Cure Cycle | Blister free surface | Blister free surface |  | Badly blistered enamel surface |  |
| 60 Seconds | 230° C | 260° C |  | 230° C |  |
| Accelerated Weathering Test (XENON ARC) |  |  |  |  |  |
| Initial Gloss 60° | 95 | 95 |  | 95 |  |
| Initial Gloss 20° | 82 | 87 |  | 86 |  |
| After 1,000 Hours |  |  |  |  |  |
| Gloss 60° | 89 | 89 |  | 79 |  |
| Gloss 20° | 62 | 62 |  | 47 |  |

EXAMPLE 4

A high solids organic solvent based enamel was prepared using polyether polyol B and acrylic resin C in combination with tetrabutoxymethyl glycoluril (TBMGU). 33 parts of polyether polyol B, 34 parts of acrylic resin C and 33 parts of the tetrabutoxymethyl glycoluril were blended together in a suitable blending mill. To this blend there is added 0.5 part of n-dodecylbenzine sulfonic acid, 1.0 part of dimethylaminoethanol and 90 parts of titanium dioxide pigment. The pigment was dispersed in the blend using a Cowles dissolver. The dispersed pigment paste was diluted to 75% solids with cellosolve. At 75% paint solids the Ford cup #4 viscosity was about 60 seconds. The enamel was sprayed on iron phosphate pretreated cold rolled steel panels and cured at 150° C. for 20 minutes. The cured films had the following properties:

| | |
|---|---|
| Film Thickness | 1.0 mil |
| Pencil Hardness | H-2H |
| Knoop hardness (KHN$_{25}$) | 12.0 |
| Gloss 60° | 77 |
| Initial impact Resistance, in. lbs. (Reverse) | 60 |
| Impact popping after exposure to Cleveland Humidity Test (60° C. on the impacted enamel) | |
| After one hour, in. lbs. | 60 |
| After two hours, in. lbs. | 50 |
| After 24 hours, in. lbs. | 50 |

The enamel, after storage at 55° C. for 3 weeks, was stable.

EXAMPLE 5

Into a three roll mill there is introduced 332 parts of titanium dioxide pigment which was dispersed with 233 parts of the acrylic resin C. To this pigment paste, 133 parts of the acrylic resin C, 92 parts of the tetrabutoxymethyl glycoluril (TBMGU), 194 parts of xylene, 23 parts of cellosolve acetate, 23 parts of n-butanol, and 8 parts of p-toluene sulfonic acid dissolved in 12 parts of isopropanol were charged and mixed thoroughly on a mechanical shaker. The resulting organo-soluble paint had a Ford cup #4 viscosity of 62 seconds at 25° C. The paint solids were 68%. Films were drawn down on zinc phosphate pretreated cold rolled steel, using a 0.002 inch draw-blade, and these coated panels were cured at 175° C. for 20 minutes. The film properties were as follows:

| | |
|---|---|
| Film Thickness | 1.0 mil |
| Gloss 60° | 76 |
| Gloss 20° | 50 |
| Pencil Hardness | F-H |
| Knoop hardness | 6.0 |
| Reverse impact resistance, in. lbs. | 50–60 |
| MEK resistance (Double rubs) | >200 |
| Humidity resistance (Cleveland Humidity Chamber, 60° C.) | No change in gloss after 10 days |
| Salt spray resistance (ASTM #B117-64) | 240 hrs. |
| Creepage along the scribe line | less than 1/32" |
| Blisters | None |

EXAMPLE 6

Into a three roll mill there is introduced 346 parts of titanium dioxide pigment and 210 parts of polyester resin D and 10 parts of cellosolve acetate and the three components were dispersed together to form a pigment paste. To this pigment paste there is charged 103 parts of the polyester resin D, 115 parts of tetrabutoxymethyl glycoluril (TMBGU), 3.1 parts of dinonyl naphthalene disulfonic acid, 117 parts of n-butanol and 88 parts of butylacetate. The charge was mixed thoroughly on a mechanical shaker. The resulting paint had a Ford cup #4 viscosity of 60 seconds at 25° C. The paint solids were 73%. Films were drawn down on zinc phosphate pretreated cold rolled steel panels, using a 0.002 inch draw-blade and the panels were baked so as to cure the coatings at 175° C. for 20 minutes. The film properties were as follows:

| | |
|---|---|
| Film Thickness | 1.0 mil |
| Gloss 60° | 86 |
| Gloss 20° | 52 |
| Pencil hardness | 2H-3H |
| Knoop hardness | 11.4 |
| Reverse Impact resistance in. lbs. | 140+ |
| MEK resistance (Double rubs) | >200 |
| Humidity resistance (Cleveland Humidity chamber, 60° C.) | No change in gloss after 10 days |
| Salt spray resistance (ASTM #B 117-64) | 240 hrs. |
| creepage along the scribe line | less than 1/32" |
| blisters | None |

In the compositions of the present invention, the component (B) is identified as an organic solvent dispersible, non-gelled, non-cross-linking polymeric material which polymeric material contains as reactive groups anyone or more of carboxyl groups, alcoholic hydroxyl groups or amide groups wherein the amount of said groups is at least about 0.5%, by weight, and not more than about 25%, by weight, based on the total weight of said polymeric material. The British Pat. No. 1,146,858 and its French counterpart Pat. No. 1,486,213 (Florus et al) cited hereinabove disclose the use of certain glycoluril derivatives in combination with self-crosslinking polymeric materials. The component (B) of said Florus et al. patents is a copolymer which may contain from 10 to 70 parts, by weight, of polymerized units of an ester of acrylic acid and/or methacrylic acid with a monohydric alcohol having from one to twenty carbon atoms and from 2 to 15 parts, by weight, of polymerized units of an α-β-ethylenically unsaturated carboxylic acid containing from 3 to 6 carbon atoms and from 0 to 85 parts by weight of polymerized units of at least one other ethylenically unsaturated comonomer. These patents teach that their copolymers may contain N-methylolacrylamide and/or N-methylolmethacrylamide and also the ethers of these amides with monohydric alcohols having from one to ten, and preferably 3 to 4, carbon atoms in amounts between about 0.5 to 40 and particularly 5 to 20 parts by weight. When these copolymers contain either the methylol acrylamides or the alkyl ethers of these methylol acrylamides, the copolymers are self-crosslinking. These polymeric materials of these foreign patents will self-crosslink under normal cure conditions of about 150° to 175° C. in a period of from 20 to about 60 minutes. The tetrabutoxymethyl glycoluril in the coating compositions of the Florus et al. patents does not function as a crosslinking agent with the polymeric material at the cure temperature 150° C. If anything, it only plasticizes the film and it does not function as an effective crosslinker but only as an additive to improve corrosion resistance.

The compositions of the present invention, on the other hand, contain an organic solvent dispersible polymeric material which is not self-crosslinking but does contain —COOH, —OH and/or —CONH$_2$ as the sole reactive groups and these groups do not self condense at the practical cure temperatures of 150° to 175° C. in a period of 20 to 60 minutes. In order to achieve efficient crosslinking reaction of the glycoluril derivatives with a non-self-crosslinking polymeric material of the class used in the compositions of the present invention requires the presence of an acid catalyst. The French and British patents cited hereinabove do not disclose, teach or suggest the use of any acid catalyst in their compositions nor do they disclose, teach or suggest the use of organic solvent dispersible materials.

The partially or fully alkylated glycoluril derivatives used in the composition of the present invention are soluble in organic solvents. By the same token, the non-gelled, non-self-crosslinking polymeric material is soluble in a host of organic solvents. Among the organic solvents which may be used as the dispersion medium for the blend of components used in the composition of the present invention are the aliphatic and aromatic solvents such as the aliphatic hydrocarbons that are normally liquid, the aliphatic alcohols, both monohydric and polyhydric, such as methanol, ethanol, propanol, butanol, amyl alcohol, hexyl alcohol and the like. Additionally, one may use ethylene glycol, propylene glycol, diethylene glycol, dipropylene glycol and the like. Among the aromatic solvents which may be used are benzene, toluene, xylene and the like. The polymeric materials are, therefore, organo solvent soluble or organo solvent dispersible.

Although the coatings of the present invention will be used principally to coat metal such as steel, aluminum and the like, these coatings may also be used on other substrates such as wood, glass, plastics, paper, textiles and the like.

I claim:

1. An organic solvent soluble composition comprising a blend of from about 2% to about 50% by weight of (A) a partially or fully alkylated glycoluril derivative having the following structural formula:

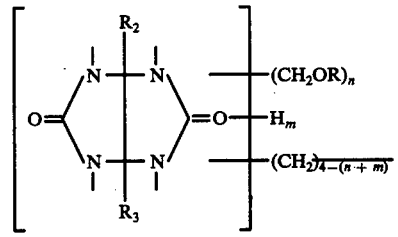

wherein $n$ is a whole integer between 1 to 4 inclusive; $m$ is a whole integer between 0 and 2 inclusive; each R is, individually, hydrogen or an alkyl radical containing from 1 to 6 carbon atoms, inclusive, wherein the said alkyl radicals may be the same or different alkyl radicals; $R_2$ and $R_3$ are separately hydrogen or an alkyl radical having from 1 to 6 carbon atoms inclusive or a phenyl radical and correspondingly from about 98% to about 50% by weight of (B) an organic solvent soluble, normally non-self-crosslinking polymeric material having as reactive groups, any one or more of carboxyl groups, alcoholic hydroxyl groups or amide groups wherein the amount of said groups is at least about 0.5% by weight, and not more than about 25%, by weight, based on the total weight of said polymeric material; and (C) from about 0.05% to 5.0% by weight of an acid catalyst based on the total weight of (A) and (B), wherein said reactive groups of (B) are heat reactive with (A) and wherein said percentages of (A) and (B), by weight, total 100% and are based on the total solids weight of (A) and (B).

2. A composition according to claim 1 wherein the glycoluril derivative is fully alkylated.

3. A composition according to claim 2 wherein the fully alkylated glycoluril derivative is fully butylated.

4. A composition according to claim 2 wherein the fully alkylated glycoluril derivative is fully methylated.

5. A composition according to claim 1 wherein the glycoluril derivative is a mixed full ether of tetramethylol glycoluril.

6. A composition according to claim 5 wherein the glycoluril derivative is the diethyl ether, dimethyl ether of tetramethylol glycoluril.

7. A composition according to claim 1 in which the glycoluril derivative is only partially alkylated.

8. A composition according to claim 7 in which the glycoluril derivative is only partially butylated.

9. A composition according to claim 7 in which the glycoluril derivative is only partially methylated.

10. A composition according to claim 1 in which the glycoluril derivative is a polymeric material having a molecular weight up to about 5,000.

* * * * *